United States Patent
Hosoda

(10) Patent No.: US 8,245,290 B2
(45) Date of Patent: Aug. 14, 2012

(54) IMAGE PROCESSING APPARATUS, IMAGE PROCESSING METHOD, PROGRAM, AND STORAGE MEDIUM FOR PERFORMING ACCESS CONTROL OF DOCUMENT INCLUDING TWO-DIMENSIONAL CODE

(75) Inventor: Yasuhiro Hosoda, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 916 days.

(21) Appl. No.: 12/131,328

(22) Filed: Jun. 2, 2008

(65) Prior Publication Data

US 2008/0307521 A1  Dec. 11, 2008

(30) Foreign Application Priority Data

Jun. 8, 2007  (JP) .................... 2007-153200

(51) Int. Cl.
*G06F 7/04* (2006.01)
*G06F 12/00* (2006.01)
*G06F 12/14* (2006.01)
*G06F 13/00* (2006.01)
*G06F 17/30* (2006.01)

(52) U.S. Cl. .................. 726/17; 726/4; 726/7

(58) Field of Classification Search .............. 726/4, 5, 726/7, 17–21
See application file for complete search history.

(56) References Cited

U.S. PATENT DOCUMENTS

| | | | |
|---|---|---|---|
| 7,526,812 B2* | 4/2009 | DeYoung | 726/26 |
| 7,869,082 B2* | 1/2011 | Hayashida et al. | 358/1.18 |
| 2004/0027604 A1* | 2/2004 | Jeran et al. | 358/1.14 |
| 2005/0171914 A1* | 8/2005 | Saitoh | 705/51 |
| 2006/0028689 A1* | 2/2006 | Perry et al. | 358/3.28 |
| 2006/0116884 A1* | 6/2006 | Itaki et al. | 704/271 |
| 2006/0188283 A1* | 8/2006 | Hirano | 399/80 |
| 2007/0079363 A1 | 4/2007 | Itoh | |
| 2007/0121174 A1* | 5/2007 | Higashiura | 358/464 |
| 2007/0283157 A1* | 12/2007 | Yami et al. | 713/175 |

FOREIGN PATENT DOCUMENTS

| | | |
|---|---|---|
| JP | 2003-150336 A | 5/2003 |
| JP | 2005-175773 A | 6/2005 |
| JP | 2006-345211 A | 12/2006 |
| JP | 2007-097024 A | 4/2007 |
| JP | 2007-121699 A | 5/2007 |

* cited by examiner

*Primary Examiner* — Jeffrey Pwu
*Assistant Examiner* — Jayesh Jhaveri
(74) *Attorney, Agent, or Firm* — Fitzpatrick, Cella, Harper & Scinto

(57) ABSTRACT

An object of the present invention is to improve usability of a copying machine. In order to achieve the object, an image processing apparatus according to the present invention has: accepting unit that accepts setting of a function from a user; first obtaining unit that obtains information of a function usable by the user; second obtaining unit that obtains information of a usable function by using a two-dimensional code of a document as an object of the function; and first executing unit that, even when the function that the accepting unit accepts setting thereof from the user is not included in the information of the usable function obtained by the first obtaining unit, executes on the document the function that the accepting unit accepts setting thereof when the function is included in the information of the usable function by the second obtaining unit.

1 Claim, 16 Drawing Sheets

ACL TABLE 700

| USER NAME | USE OF MFP FUNCTION | | | | | MFP SETTING | | TWO-DIMENSIONAL CODE | | CONTENT ACCESS | ACTUAL PERFORMANCE VALUE OF PRINTING |
|---|---|---|---|---|---|---|---|---|---|---|---|
| | COLOR PRINTING | BLACK-AND-WHITE PRINTING | THE LIMIT NUMBER OF PRINTING | SCAN | TRANS-MIS-SION | APPARATUS SETTING | PROGRAM INSTALLATION | WRITE | READ | | |
| suzuki | 1 | 1 | 2000 | 1 | 1 | 1 | 1 | 1 | 1 | 1 | 1200 |
| tanaka | 0 | 1 | 1500 | 1 | 0 | 0 | 0 | 0 | 1 | 0 | 1499 |
| sato | 0 | 1 | 1000 | 1 | 0 | 0 | 0 | 0 | 1 | 0 | 123 |
| ... | | | | | | | | | | | |

701 — suzuki row
702 — tanaka row
703 — sato row

FIG.7

```
<?xml version="1.0" encoding="UTF-8"?>
<ACT xmlns:xsi="http://www.w3.org/2001/XMLSchema-instance">
  <Version>0</Version>
  <UserInfo>
    <UserName>Taro</UserName>                                  ⎫
    <BaseRole> PowerUser </BaseRole>                           ⎬ 801
    <UserEmail> taro@xxx.yyy </UserEmail>                      ⎭
  </UserInfo>
  <DeviceInfo>
    <PrintSecurityLevel> 0</PrintSecurityLevel>
  </DeviceInfo>
  <DeviceAccessControl>
    <AttributeCategory Name="DeviceCapabilityRestriction" CategoryStatus="Static">  ⎫
      <saml:AttributeStatement>                                                     ⎪
        <saml:Attribute Name="PdlPrint">                                            ⎪
          <saml:AttributeValue Name="PdlPrintFlag">Permit</saml:AttributeValue>     ⎬ 802
          <saml:AttributeValue Name="ColorPrint">Color</saml:AttributeValue>        ⎪
          <saml:AttributeValue Name="Simplex">Deny</saml:AttributeValue>            ⎪
        </saml:Attribute>                                                           ⎭
      </saml:AttributeStatement>
    </AttributeCategory>
  </DeviceAccessControl>
</ACT>
```

FIG.8

IMAGE PROCESSING APPARATUS, IMAGE PROCESSING METHOD, PROGRAM, AND STORAGE MEDIUM FOR PERFORMING ACCESS CONTROL OF DOCUMENT INCLUDING TWO-DIMENSIONAL CODE

BACKGROUND OF THE INVENTION

1. Field of the Invention

The present invention relates to an image processing apparatus, an image processing method, a program, and a storage medium for performing access control of a document including a two-dimensional code.

2. Description of the Related Art

Japanese Patent Laid-Open No. 2003-150336 discloses an access control server which manages a copying machine.

In the invention disclosed in Japanese Patent Laid-Open No. 2003-150336, access restriction information of each user is retained in advance in the access control server which manages a copying machine.

When a user inputs a user ID and a password to a copying machine to use the copying machine, the user ID of the user is transmitted to the access control server. Upon reception of the user ID, the access control server performs user authentication (that is, determines whether the received user ID and password are correct). When the user authentication is completed, the access control server retrieves an access control token corresponding to the user ID in a database, and transmits the retrieved access control token to the copying machine.

The access control token is information indicating, for example, that "this user is permitted to use this function, but is prohibited from using that function".

Upon reception of the access control token, the copying machine permits the user to use only "the function which the user is permitted to use" indicated in the access control token.

SUMMARY OF THE INVENTION

However, when the functions of the copying machine are restricted by using only the user ID of the user authenticated with respect to the copying machine (namely, the user who logged in on the copying machine), there occurs a problem as described below.

Briefly, a low level user cannot use a function, which only a high level user is permitted to use, when needed. In specific, when a low level user, who is permitted to use only a black-and-white copy function, needs to use a color copy function by being asked by his/her superior, who is a high level user permitted to use the color copy function, the low level user cannot carry out what is asked by the superior.

The present invention intends to solve the problem described above. An object of the present invention is to improve usability of a copying machine by permitting a user who is authenticated with respect to the copying machine to use, under certain conditions, a function which the user is not supposed to be able to use by an authority of the user.

In order to achieve the above object, an image processing apparatus according to the present invention comprises: accepting unit that accepts setting of a function from a user; first obtaining unit that obtains information of a function usable by the user; second obtaining unit that obtains information of a usable function by using a two-dimensional code of a document as an object of the function; and first executing unit that, even when the function that the accepting unit accepts setting thereof from the user is not included in the information of the usable function obtained by the first obtaining unit, executes on the document the function that the accepting unit accepts setting thereof when the function is included in the information of the usable function by the second obtaining unit.

As described above, by practicing the present invention, it is possible to achieve restriction of apparatus use by each document and restriction of apparatus use by each user at the same time without largely increasing data amount managed by a two-dimensional code, a copying machine or a server. In particular, since user access rights are managed by a server or a copying machine, it is not necessary to store the user access rights in the two-dimensional code. Since a document including a two-dimensional code is controlled by the access right of a user who created the document, it is not necessary to manage access rights by each document. Furthermore, since a document including a two-dimensional code is controlled by the access right of a user who created the document, a user having a low access right can also flexibly handle the document by an authority equal to that of the user who created the document only as to particular documents.

Further features of the present invention will become apparent from the following description of exemplary embodiments (with reference to the attached drawings).

BRIEF DESCRIPTION OF THE DRAWINGS

FIG. 7 is a table illustrating an example of data stored in an ACL;

FIG. 8 illustrates an example of access control information;

DESCRIPTION OF THE EMBODIMENTS

Figure 1:
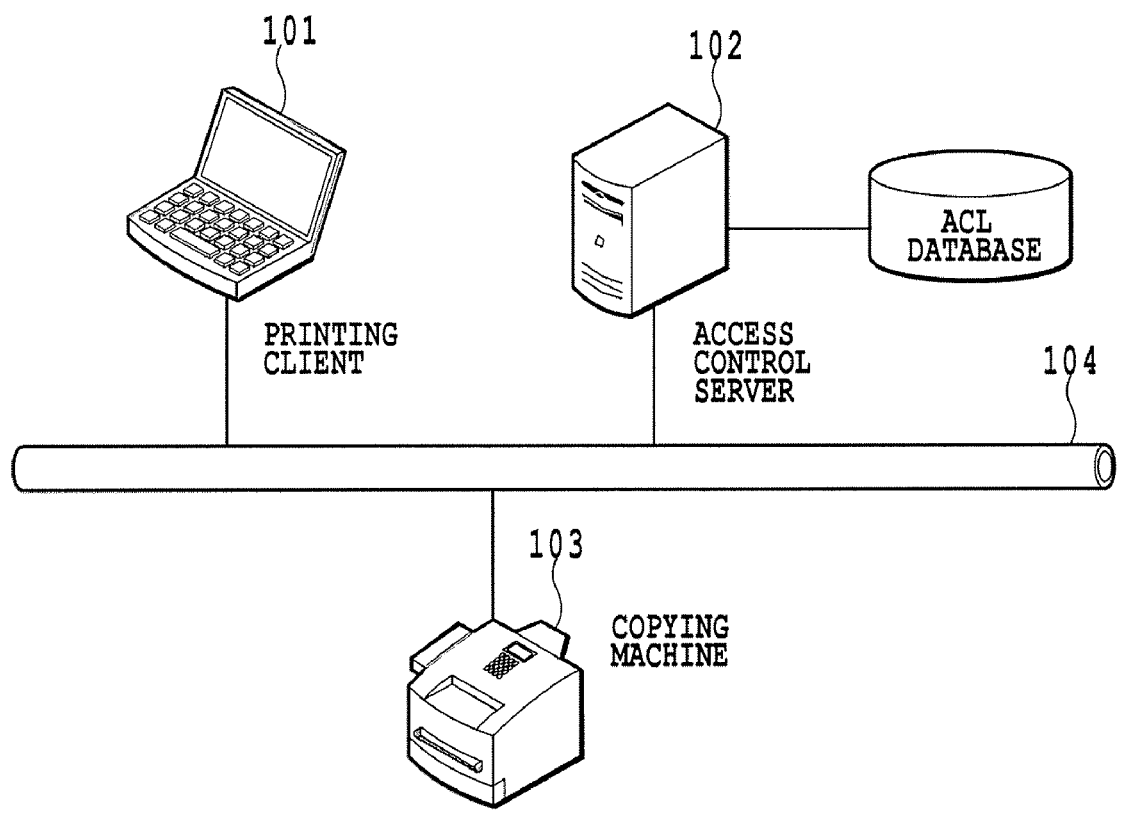
FIG. 1 is a simplified view illustrating hardware according to an embodiment 1.

Preferred embodiments of the present invention will be described below with reference to the drawings.
(Embodiment 1)
<Image Processing Apparatus (FIG. 1)>
An embodiment 1 will be described in detail with reference to the drawings. FIG. 1 is a block diagram illustrating an image processing apparatus according to the embodiment 1 of the present invention. In the image processing apparatus, a printing client 101, an access control server 102 and a copying machine 103 are connected to a network 104 and can communicate with each other.

The printing client 101 can issue a print command via a printer driver to the copying machine 103.

The access control server 102 is a server for centrally managing an access control information list of a user using the copying machine 103, and has the following functions, i.e. (1) a user authentication function (function to determine whether a user ID and a password input by a user to the copying machine are correct), and (2) a ticket issuing function for using the copying machine 103.

<Copying Machine 103 (FIG. 2)>

Figure 2:
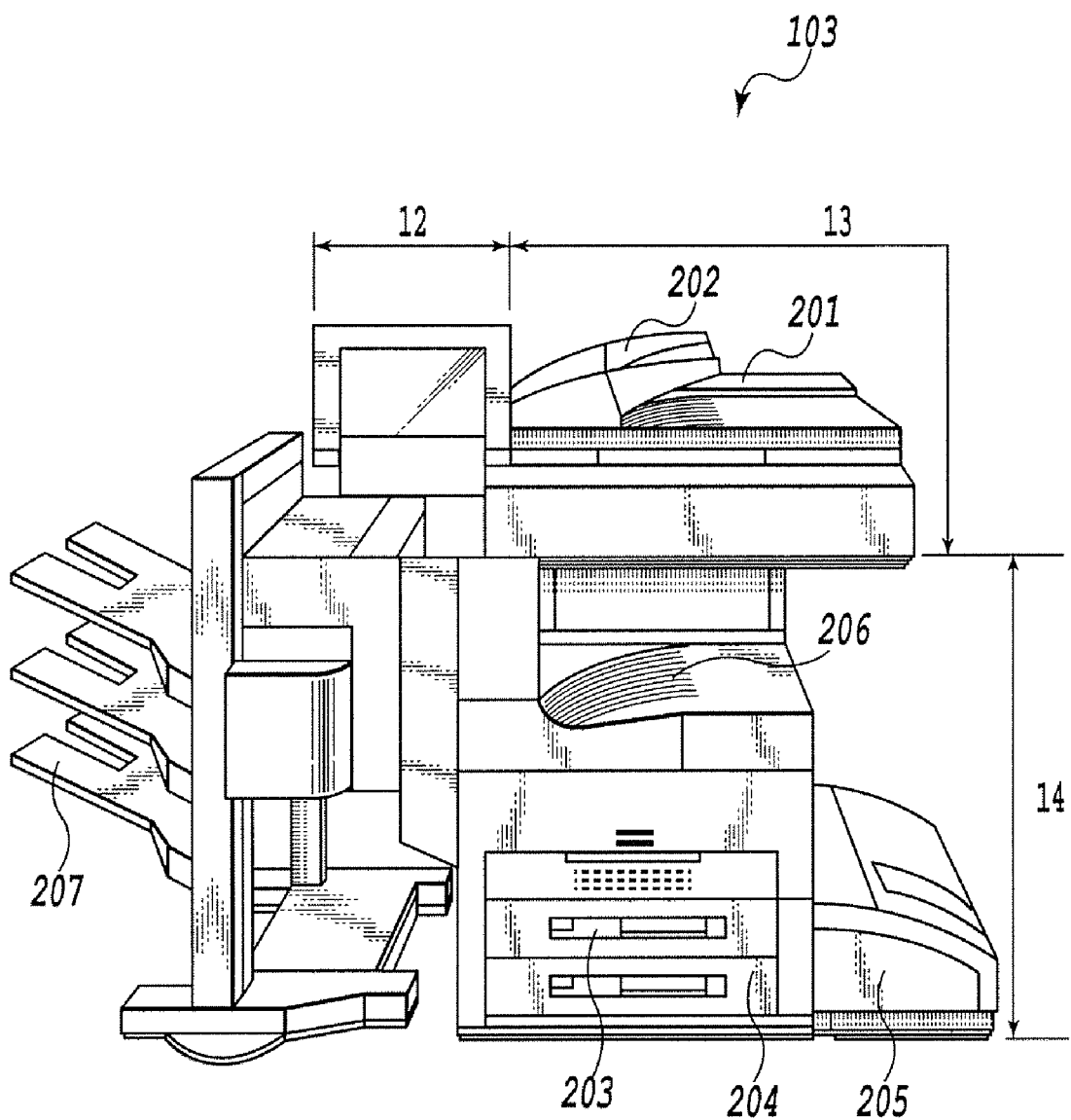
FIG. 2 illustrates an outline of a copying machine.

FIG. 2 illustrates an outline of the copying machine 103. A scanner unit 13 converts image information to an electric signal by inputting reflected light obtained through exposure-scanning of an image on a document into a CCD. The scanner unit further converts the electric signal to a brightness signal constituted by R, G and B colors, and outputs the brightness signal as image data to a controller 11.

The document is placed in a tray 202 of a document feeder 201. When a user instructs to start reading the document from an operation unit 12, the controller 11 gives a document reading instruction to the scanner unit 13. Upon reception of the instruction, the scanner unit 13 performs a document reading operation by feeding the document sheet by sheet from the tray 202 of the document feeder 201. Note that a method of reading a document is not limited to the automatic feeding method by the document feeder 201, and a method of placing a document on an unshown glass surface and moving an exposure unit to scan the document may be used.

A printer unit 14 is an image forming device for forming the image data received from the controller 11 on a paper. Although an electrophotographic method using a photosensitive drum or a photosensitive belt is used as an image forming method in the embodiment 1, the present invention is not limited to the electrophotographic method. For example, an inkjet method for performing printing on a paper by ejecting ink from a minute nozzle array may be applied. The printer unit 14 is provided with a plurality of paper cassettes 203, 204, and 205 so that various paper sizes and various paper orientations can be selected. Printed papers are discharged to a copy receiving tray 206.

<Detailed Description of the Controller 11 (FIG. 3)>

Figure 3:
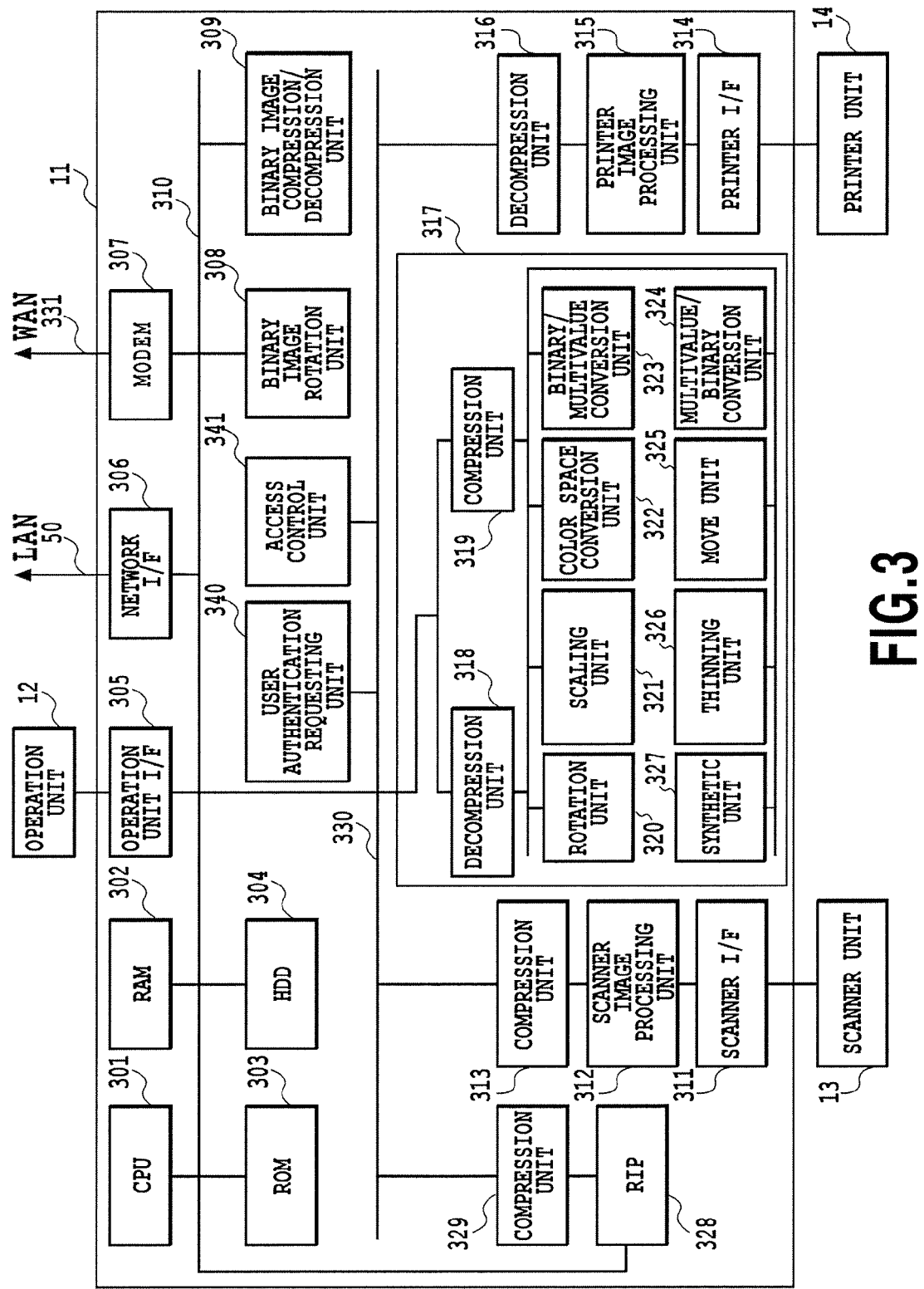
FIG. 3 illustrates a copying machine.

FIG. 3 is a block diagram explaining the controller 11 of the copying machine 103 in more detail.

The controller 11 is electrically connected to the scanner unit 13 and the printer unit 14, and is also connected to a personal computer (PC) 40 and external apparatuses via an LAN 50 and a WAN 331. Image data or device information can be thereby input and output.

A CPU 301 generally controls access with connected various devices based on a control program or the like stored in an ROM 303, and also, generally controls various processes executed in the controller. An RAM 302 is a system work memory for the CPU 301 to operate, and is also a memory for temporarily storing image data. The RAM 302 includes an SRAM in which stored contents are retained even after power OFF and a DRAM in which stored contents are deleted after power OFF. A boot program or the like of the apparatus is stored in the ROM 303. An HDD 304 is a hard disk drive and is capable of storing system software or image data.

An operation unit I/F 305 is an interface unit for connecting a system bus 310 and the operation unit 12. The operation unit I/F 305 receives image data to be displayed on the operation unit 12, from the system bus 310 and outputs the image data to the operation unit 12, and also, outputs information input from the operation unit 12 to the system bus 310.

A network I/F 306 is connected to the LAN 50 and the system bus 310, and inputs and outputs information. A modem 307 is connected to the WAN 331 and the system bus 310, and inputs and outputs information. A binary image rotation unit 308 changes an orientation of image data before transmission. A binary image compression and decompression unit 309 converts a resolution of image data before transmission to a predetermined resolution or a resolution matching a performance of a transmission destination. JBIG, MMR, MR, and MH methods are employed for compressing and decompressing image data. An image bus 330 is a transmission line for exchanging image data, and has a PCI bus or IEEE1394.

A scanner image processing unit 312 corrects, processes and edits image data received from the scanner unit 13 via a scanner I/F 311. The scanner image processing unit 312 determines whether the received image data is a color document or a black-and-white document, or whether the received image data is a text document or a photograph document, and attaches the determination result to the image data. Such attached information is referred to as attribute data. The details of processing performed in the scanner image processing unit 312 will be described below.

Figure 4:
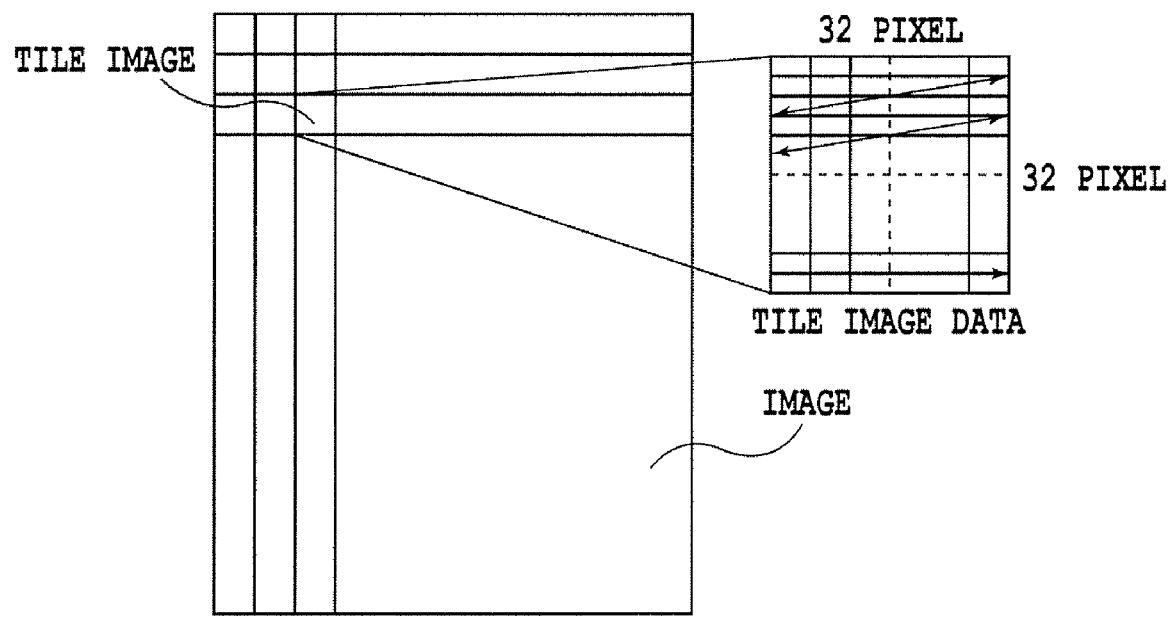
FIG. 4 conceptually illustrates tile data.

A compression unit 313 receives the image data and divides the image data into 32×32-pixel blocks. The image data of 32×32 pixels is referred to as tile data. FIG. 4 conceptually illustrates the tile data. An area corresponding to the tile data in a document (paper medium before reading) is referred to as a tile image. Average brightness information in the 32×32-pixel blocks and a coordinate position of the tile image on the document are added to the tile data as header information. The compression unit 313 further compresses the image data consisting of a plurality of tile data. A decompression unit 316 decompresses the image data consisting of a plurality of tile data and then, raster-develops and transmits the image data to a printer image processing unit 315.

The printer image processing unit 315 receives the image data transmitted from the decompression unit 316 and performs image processing on the image data with reference to the attribute data attached to the image data. The image data after image processing is output to the printer unit 14 via a printer I/F 314. The details of processing performed in the printer image processing unit 315 will be described below.

An image converting unit 317 performs a predetermined conversion process on image data. The processing unit comprises processing units as described below.

A decompression unit 318 decompresses the received image data. A compression unit 319 compresses the received image data. A rotation unit 320 rotates the received image data. A scaling unit 321 converts a resolution of the received image data (for example, from 600 dpi to 200 dpi). A color space conversion unit 322 converts a color space of the received image data. The color space conversion unit 322 can perform a known ground color removing process using a matrix or a table, a known LOG converting process (RGB→CMY), or a known output color correcting process (CMY→CMYK). A binary/multivalue conversion unit 323 converts the received two-tone image data to 256-tone image data. A multivalue/binary conversion unit 324 converts the received 256-tone image data to two-tone image data by such a method as an error diffusion process.

A synthetic unit 327 combines the received two image data to generate one image data. When the two image data are combined, a method of employing an average of brightness values of pixels to be combined as a composite brightness value, or a method of employing a brightness value of a pixel having a higher brightness level as a brightness value of composite pixel are applied. A method of employing a brightness value of a pixel having a lower brightness level as a brightness value of composite pixel may be also applied. Furthermore, a method of determining a brightness value of composite pixel by a logical OR operation, a logical AND operation, a logical exclusive OR operation or the like between pixels to be combined may be also applied. All of these combining methods are well known. A thinning unit 326 performs resolution conversion by skipping pixels of the received image data, and generates image data of ½, ¼ and ⅛. A move unit 325 adds or removes a margin space to and from the received image data.

An RIP 328 connected to a compression unit 329 receives intermediate data generated based on PDL code data transmitted from the PC 40 or the like, and generates bitmap data (multivalued data).

<Detailed Description of the Scanner Image Processing Unit 312 (FIG. 5)>

Figure 5:
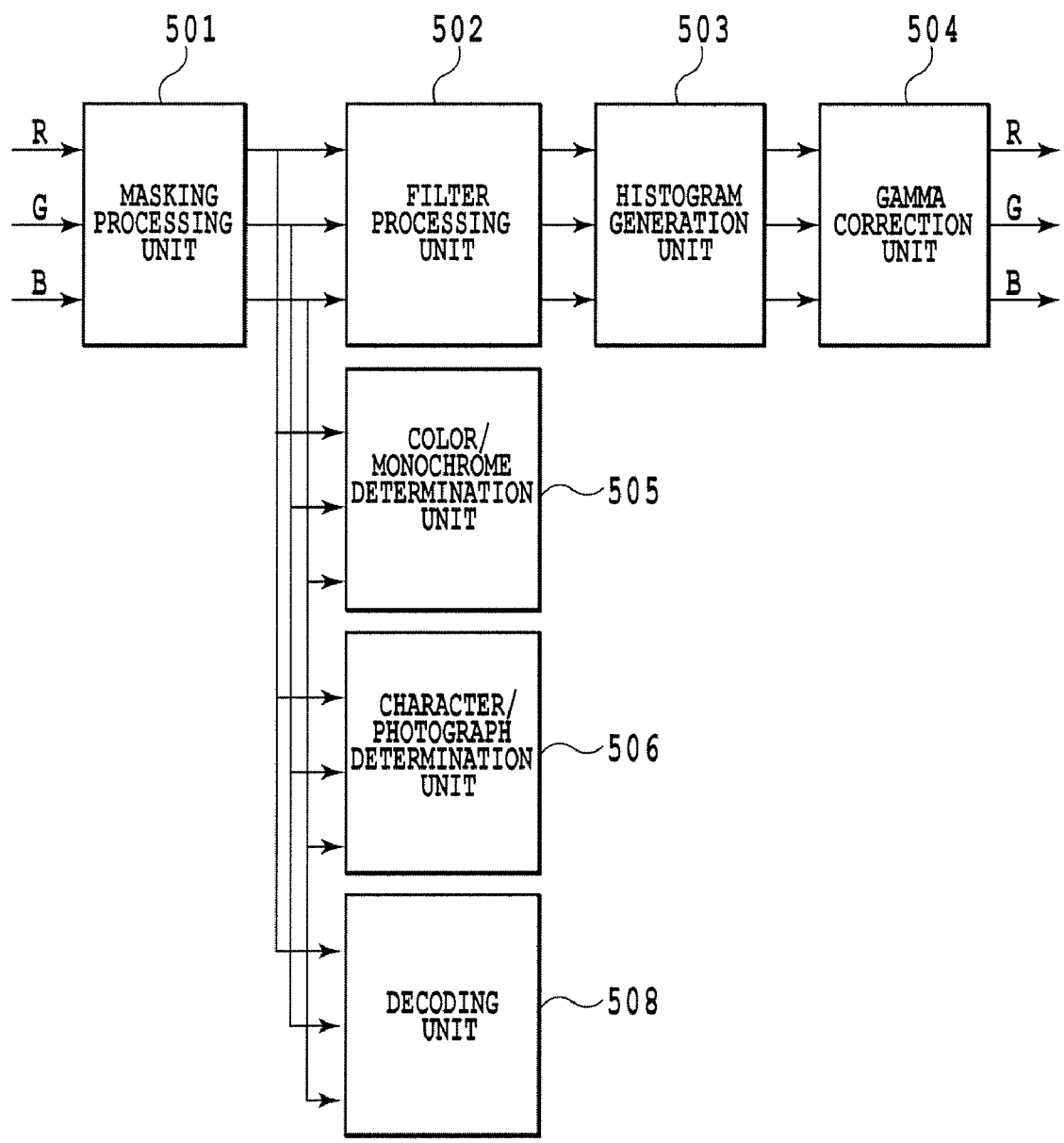
FIG. 5 is a block diagram of a scanner image processing unit.

FIG. 5 illustrates an interior of the scanner image processing unit 312.

The scanner image processing unit 312 receives image data constituted by brightness signals respectively having 8-bit RGB colors. The brightness signals are converted to standard brightness signals independent of a CCD filter color by a masking processing unit 501.

A filter processing unit 502 appropriately corrects a spatial frequency of the received image data. The processing unit performs arithmetic processing on the received image data using, for example, a 7×7 matrix. In a copying machine or a combination machine, a text mode, a photograph mode, or a text/photograph mode can be selected as a copy mode. When the text mode is selected by a user, the filter processing unit 502 applies a text filter to the entire image data. When the photograph mode is selected, the filter processing unit 502 applies a photograph filter to the entire image data. When the text/ photograph mode is selected, the filter processing unit 502 adaptively switches filters on each pixel in accordance with a text/photograph determining signal (part of the attribute data) described below. That is, the filter processing unit 502 determines whether the photograph filter or the text filter is applied to each pixel. The photograph filter has a coefficient for smoothing only high frequency components, so that roughness in an image becomes insignificant. The text filter has a coefficient for strongly performing edge reinforcement, so that characters are sharpened.

A histogram generation unit 503 samples brightness data of each pixel constituting the received image data. More specifically, the histogram generation unit 503 samples brightness data in a rectangular area defined by a start point and an end point, which are respectively specified in a main scanning direction and a sub-scanning direction, at constant pitches in the main scanning direction and the sub-scanning direction. Then, the histogram generation unit 503 generates histogram data based on the sampling result. The generated histogram data is used to estimate a ground color level when the ground color removing process is performed. An input-side gamma correction unit 504 converts the received image data to brightness data having a nonlinear characteristic by using a table or the like.

A color/monochrome determination unit 505 determines whether each of the pixels constituting the received image data is chromatic or achromatic, and attaches the determination result as a color/monochrome determining signal (part of the attribute data) to the image data.

A character/photograph determination unit 506 determines whether each of the pixels constituting the image data is a pixel constituting a character, a pixel constituting a halftone dot, a pixel constituting a character within a halftone dot, or a pixel constituting a solid image based on a pixel value of each pixel and pixel values of adjacent pixels. A pixel which is not any one of the above pixels is a pixel constituting a white area. The determination result is attached as the text/photograph determining signal (part of the attribute data) to the image data.

A decoding unit 508 detects presence of encoded image data if there is encoded image data in the image data output from the masking processing unit 501, and decodes the detected encoded image data to retrieve information.

<Detailed Description of the Printer Image Processing Unit 315 (FIG. 6)>

Figure 6:
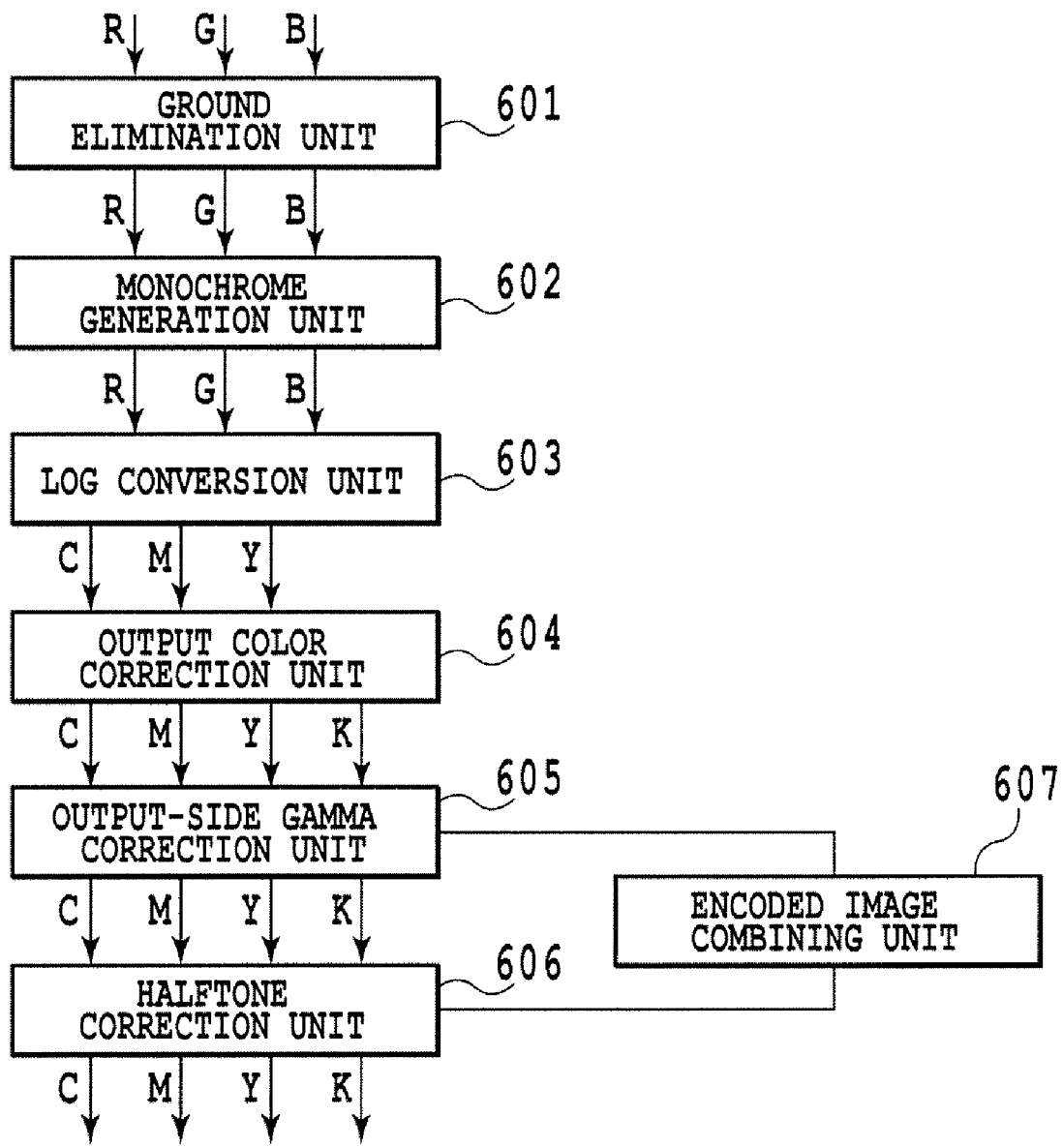
FIG. 6 is a block diagram of a printer image processing unit.

FIG. 6 illustrates a process flow performed in the printer image processing unit 315.

The ground color elimination unit 601 removes (eliminates) ground colors of the image data by using the histogram generated in the scanner image processing unit 312. A monochrome generation unit 602 converts color data to monochrome data. A log conversion unit 603 performs brightness/density conversion. For example, the log conversion unit 603 converts input RGB image data to CMY image data. An output color correction unit 604 performs output color correction. For example, the output color correction unit 604 converts input CMY image data to CMYK image data by using a table or a matrix. An output-side gamma correction unit 605 performs correction such that a signal value input to the output-side gamma correction unit 605 and a reflection density value of an output copy are proportional to each other. An encoded image combining unit 607 combines encoded image data generated by an "encoding process" described below and (document) image data. A halftone correction unit 606 performs halftone processing in accordance with the number of tones of the printer unit to which a copy is output. For example, the halftone correction unit 606 performs binarization or 32-valued processing on the received high-tone image data.

Each processing unit in the scanner image processing unit 312 and the printer image processing unit 315 may output the received image data without performing any processing. In the following description, transferring data through a certain processing unit without performing any processing is referred to as "passing through a processing unit".

<Encoding Process>

The CPU 301 is capable of performing control to encode information to be encoded to generate encoded image data.

In the present specification, the encoded image unit an image such as a two-dimensional code image and a bar-code image, or an image generated by a digital watermark technology.

The CPU 301 is also capable of performing control to transmit the generated encoded image data to the encoded image combining unit 607 in the printer image processing unit 315 by using an unshown data bus.

The above control (generation control and transmission control of the encoded image) is performed by executing a program stored in the RAM 302.

<User Authentication Requesting Unit 340>

A user authentication requesting unit 340 performs control to transmit a user ID and a password input via the operation unit 12 or the LAN 50 to the access control server 102 via the LAN 50.

The access control server 102 determines whether the user ID and password are valid, and when the user ID and password are valid, user authentication is completed.

Then, the access control server 102 retrieves an access control token corresponding to the user ID in a database, and transmits the access control token obtained by the retrieval to the copying machine 103.

<Access Control Unit 341>

An access control unit 341 obtains the above access control token and performs control based on the access control token.

<Access Control Token>

FIG. 7 illustrates one example of an access control token list (on which a plurality of access control tokens are listed) stored in a database.

FIG. 7 illustrates one example of one access control token in the access control token list stored in a database 700.

The access control token includes, for example, information as described below, i.e., (1) an authority to use copying machine functions, (2) an authority to set a copying machine, (3) use of a two-dimensional code, (4) whether or not access to contents is permitted, and (5) an actual performance value of printing.

Specifically, (1) the authority to use copying machine functions includes, for example, whether or not color printing is permitted, whether or not black-and-white printing is permitted, the limit number of printing papers, whether or not use of a scanning function is permitted, and whether or not use of a data transmitting function is permitted. (2) The authority to set a copying machine includes, for example, whether or not changing apparatus setting is permitted, program installation, and firmware update. (3) The use of a two-dimensional code includes, for example, whether or not creating a document including a two-dimensional code (Write) is permitted, and whether or not reading a two-dimensional code included in a document (Read) is permitted. (4) Whether or not access to contents is permitted includes whether or not access to contents (document data, image data, music data, program data or the like) stored a hard disk in a copying machine or an external server is permitted.

As shown in FIG. 7, suzuki 701 is permitted to use all functions, the values of which are set to 1. Meanwhile, as shown in FIG. 7, tanaka 702 is permitted to use functions, the values of which are set to 1, and is prohibited from using functions, the values of which are set to 0. That is, tanaka 702 is prohibited from using color printing and transmitting, changing apparatus setting of a copying machine, installing a program, creating a document including a two-dimensional code (Write), and using content access. Sato 703 is prohibited from using the same functions as those which tanaka 702 is prohibited from using, and is permitted to use the same functions as those which tanaka 702 is permitted to use.

<Ticket for Using the Copying Machine>

In the embodiment 1, a ticket may further include information as described below, i.e., (1) user ID, (2) information indicating validity of the ticket, (3) information indicating an expiration date of the ticket, and (4) information for detecting falsification of the above data (hash value or the like). Specifically, (2) the information indicating validity of the ticket includes, for example, an electronic signature, a digital signature (ITU-T recommendation: X.500), and an electronic certificate (ITU-T recommendation: X.509). (3) The information indicating an expiration date of the ticket includes, for example, an expiration date of the signature and an expiration date of the ticket.

The information indicating validity of the ticket and included in the ticket (the electronic signature, the digital signature and the electronic certificate) is considered to be issued by the access control server 102. However, the access control server 102 may obtain the information from other servers or external servers on the internet such as VeriSign.

<Process of Generating a Document Including a Two-Dimensional Code—Created By the Copying Machine>

Figure 9:
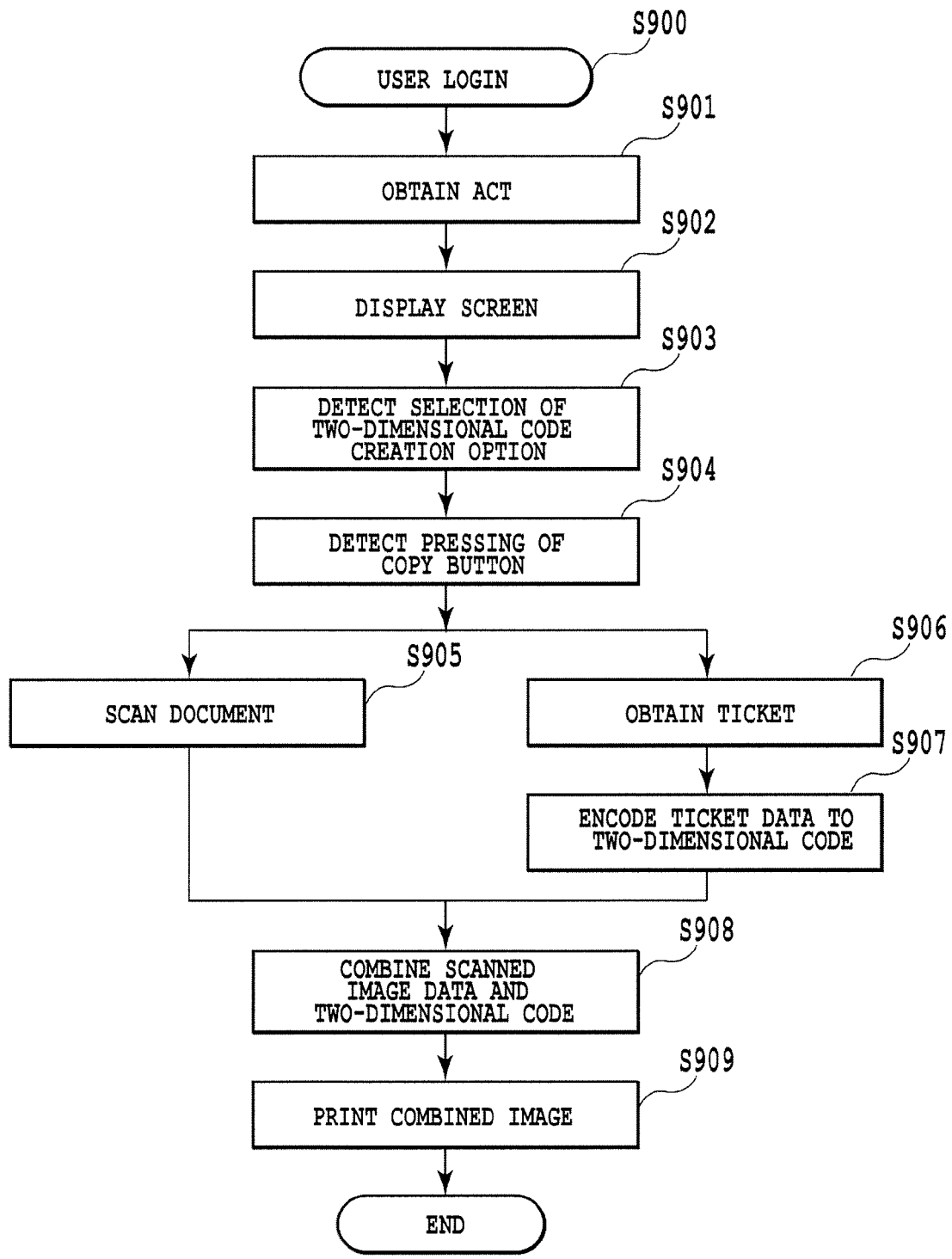
FIG. 9 is a flowchart illustrating operations when a document including a two-dimensional code is created.

A process of generating a document including a two-dimensional code will be described below with reference to a flowchart of FIG. 9. All the process steps described below using FIG. 9 are executed by the CPU 301 shown in FIG. 3.

Figure 10:
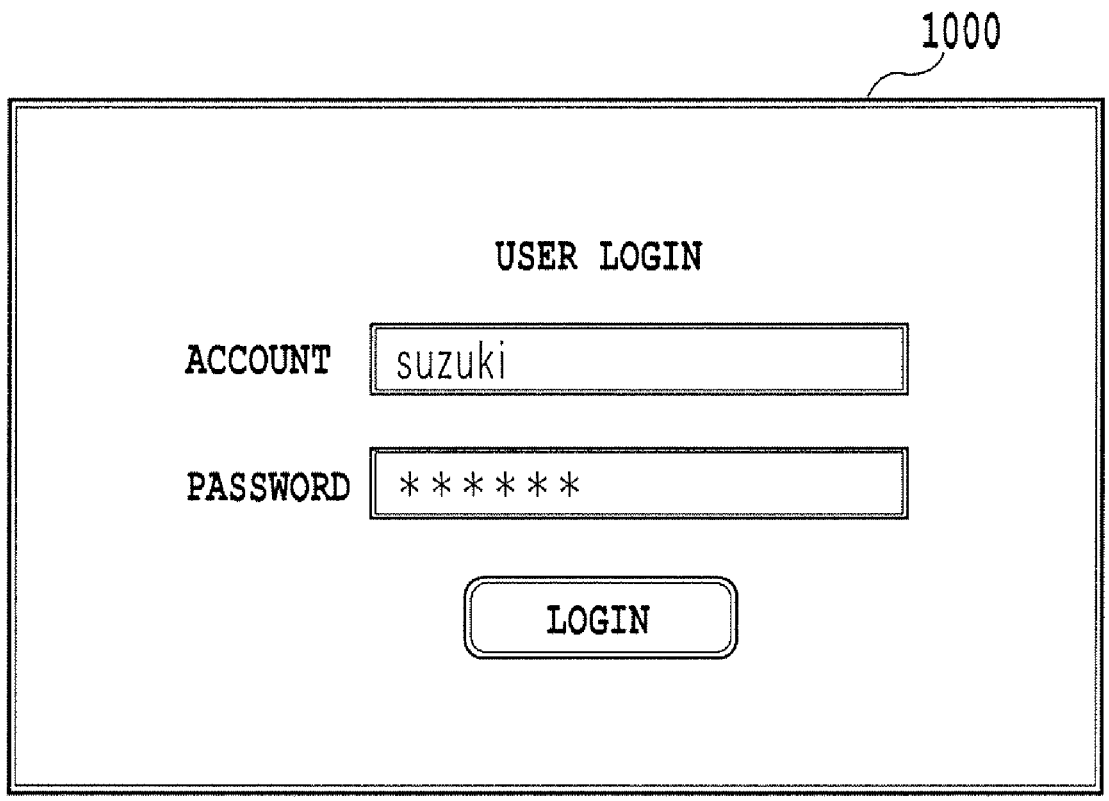
FIG. 10 illustrates an example of a user login screen displayed in an operation screen of a copying machine.

When a user inputs a user ID and a password from the operation unit 12 into a login screen 1000 shown in FIG. 10 displayed in an operation screen of the copying machine, the user authentication requesting unit 340 of the copying machine accepts the input (step S900). The user authentication requesting unit 340 transmits the user ID and password to the access control server 102 via the LAN 50.

The access control server 102 determines whether the user ID and password are valid, and when the user ID and password are valid, user authentication is completed.

The access control server 102 retrieves the access control token corresponding to the user ID in the database and transmits the access control token obtained by the retrieval to the copying machine 103.

The copying machine receives the above access control token (step S901).

Then, the operation screen is displayed (step S902). In the embodiment 1, when the operation screen is displayed, the received access control token is not used. Therefore, for example, even when such information that "use of a color copy function is prohibited" is included in the access control token in a ticket, the default operation screen is displayed by disregarding the information.

Figure 11:
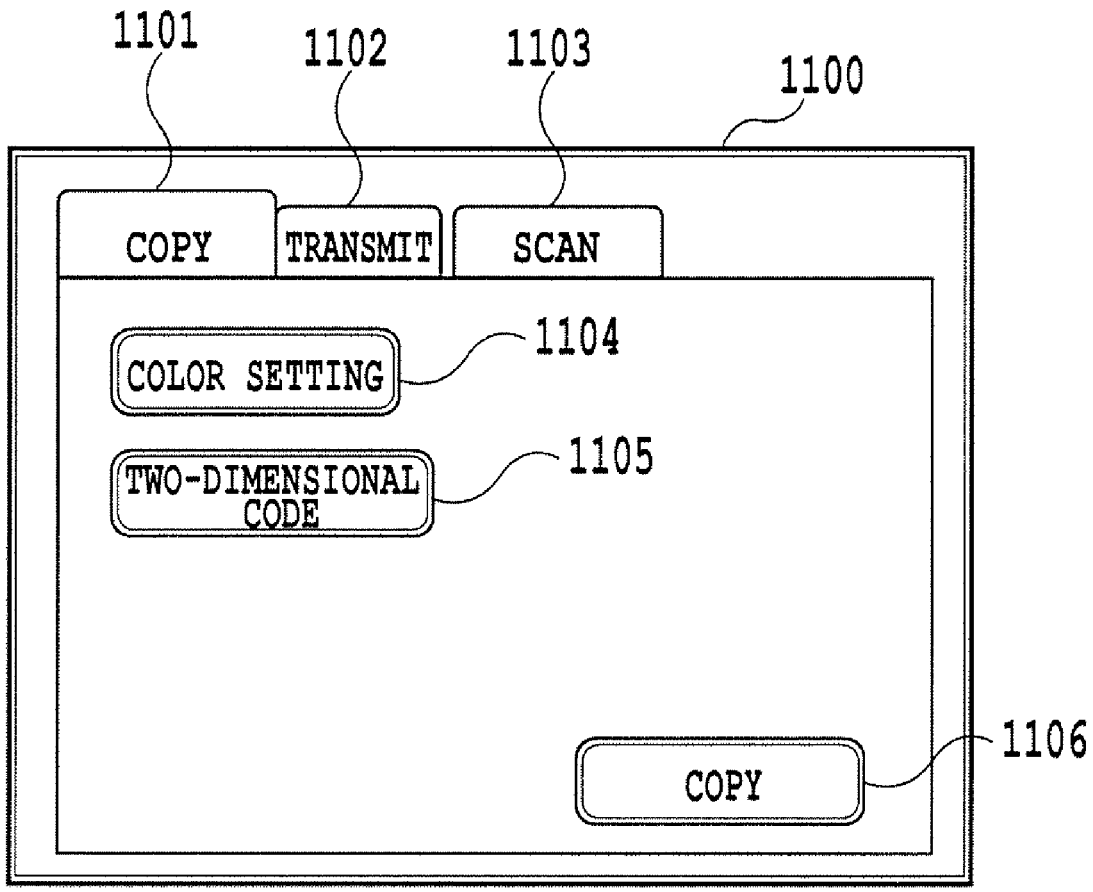
FIG. 11 illustrates an example of a screen after login displayed in an operation screen of a copying machine.

A screen 1100 shown in FIG. 11 is one example of the operation screen. A copy function tab 1101, a transmitting function tab 1102, a scanning function tab 1103, a color setting button 1104, a two-dimensional code creation button 1105, and a two-dimensional code reading button 1106 are displayed in the screen 1100.

The following description is based on the assumption that suzuki 701 permitted to use the two-dimensional code creation button is user-authenticated.

When the user selects the two-dimensional code creation button 1105, the copying machine detects that the two-dimensional code creation button has been selected (step S903). When the copying machine detects that the copy button 1106 has been pressed (step S904), the copying machine starts a scanning operation of a document (step S905), and an obtaining operation of a ticket (step S906).

In the obtaining operation of a ticket (step S906), the copying machine requests a ticket to be embedded in a two-dimensional code to the access control server. In the embodiment 1, the electronic signature of the access control server, the user ID, and the expiration date of the ticket are included in the ticket. The copying machine encodes the ticket received in the step S906 to a two-dimensional code (step S907).

The image data scanned in the step S905 and the encoded image data obtained by encoding in the step S907 are combined in a step S908. The combined image is printed out (step S909), and the process of generating a document including a two-dimensional code is terminated.

<Process of Generating a Document Including a Two-Dimensional Code—Created From the Printing Client>

Figure 12:
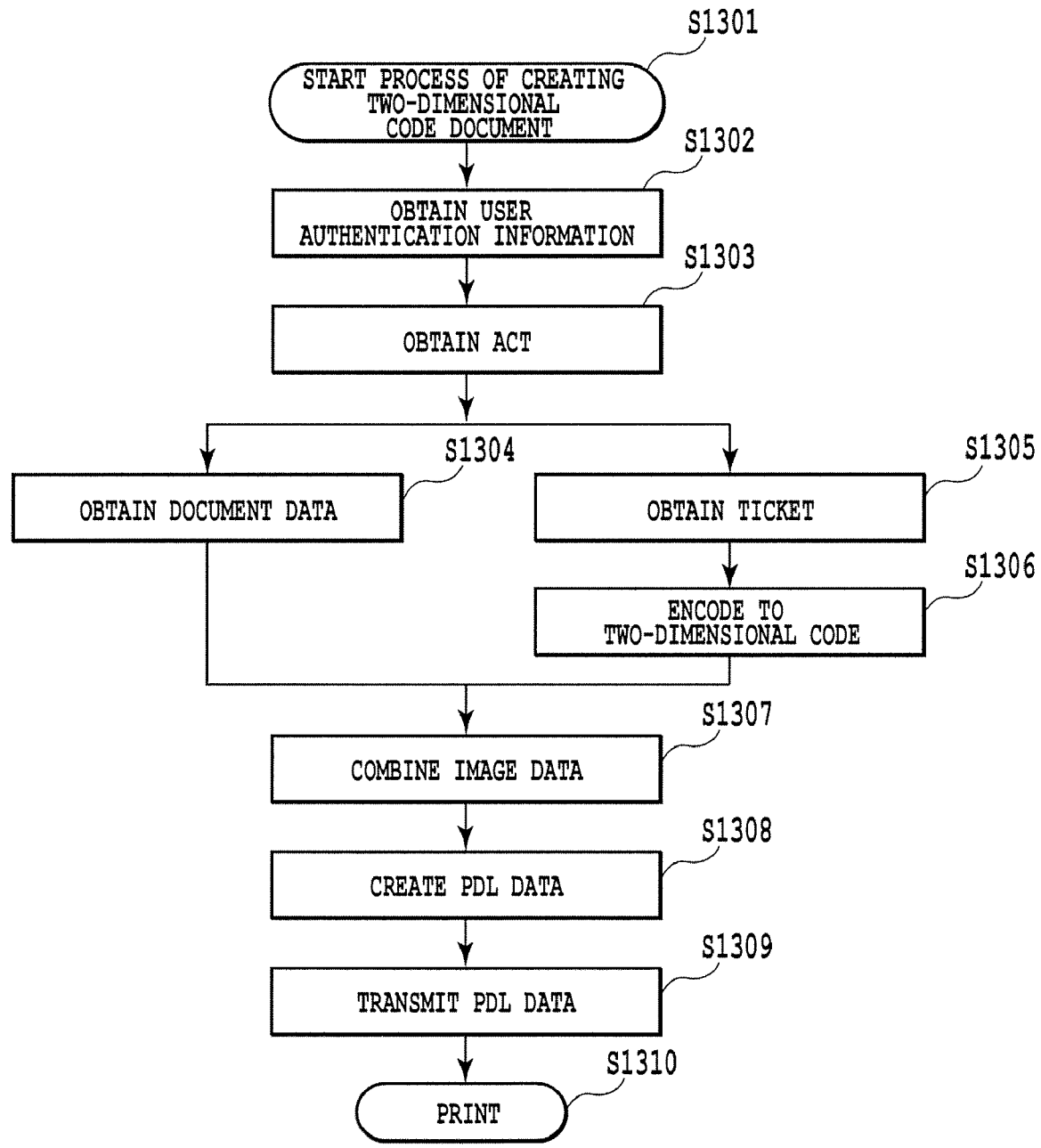
FIG. 12 is a flowchart illustrating operations when a document including a two-dimensional code is created from a printing client.

Next, a process of creating a document including a ticket encoded by a two-dimensional code from the printing client 101 will be described with reference to a flowchart of FIG. 12. All the process steps described below using FIG. 12 are executed by the CPU 301 shown in FIG. 3.

The process of creating a document including a two-dimensional code is performed by software such as an application for creating a two-dimensional code or a printer driver installed in the printing client. The process of creating a two-dimensional code document is started in a step S1301. Document forming software obtains a user ID (step S1302). User authentication information may be obtained from an operating system or a user interface provided to the document forming software.

Next, the document forming software transmits the user ID to the access control server 102. As the response, the document forming software receives the access control token (ACT) for a user having the user ID from the access control server 102 (step S1303). The document forming software analyzes the received access control token and when it is detected that the user does not have an authority to create a two-dimensional code, the document forming software can terminate the process.

The document forming software obtains document data (for example, a normal word file) in a step S1304. A ticket to be embedded in a document by a two-dimensional code is obtained from the access control server in a step S1305. In the embodiment 1, the user ID, the signature of the access control server and the expiration date of the ticket are included in the ticket. In a step S1306, the ticket is encoded to a two-dimensional code.

The copying machine encodes the received ticket to a two-dimensional code (step S1306). The document data received in the step S1304 and the two-dimensional code obtained by encoding in the step S1306 are combined (step S1307). When there is no document data, there is provided an image only with the two-dimensional code, and thus, the combining process (step S1307) is not required.

The CPU 301 further converts the combined image to page description language (PDL) data which can be analyzed by the copying machine (step S1308).

The CPU 301 transmits the generated PDL data to the copying machine and gives the copying machine a command to perform a printing process in a step S1309. Upon reception of the command, the copying machine obtains the combined image from the PDL data and prints out the combined image (step S1310).

The document forming software may optionally obtain apparatus setting information, program data, content data, workflow data or the like and embed the information in the printed document by encoding the information with the ticket data to the two-dimensional code.

<Operations When the Document Including the Two-Dimensional Code is Scanned>

Figure 13:
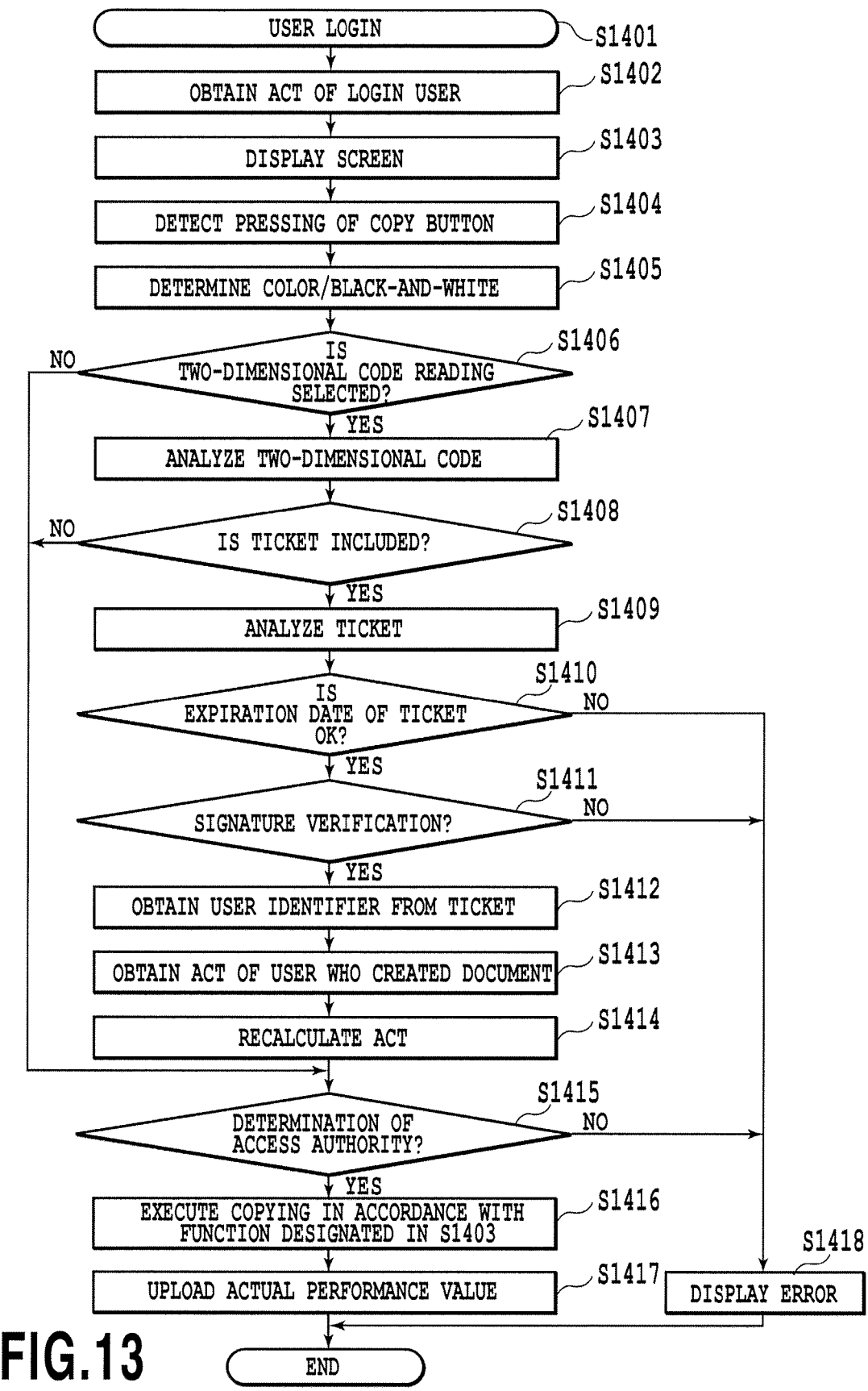
FIG. 13 is a flowchart illustrating operations when a document including a two-dimensional code is copied.

Next, operations when a user inputs a user ID and a password to the copying machine and the document including the two-dimensional code is scanned will be described with reference to a flowchart of FIG. 13. All the process steps described below using FIG. 13 are executed by the CPU 301 shown in FIG. 3.

In the flowchart, operations in the case where tanaka 702 logs into the copying machine and color-copies a document created by suzuki 701 will be described.

When the user inputs a user ID and a password from the operation unit 12 into the login screen displayed in the operation screen of the copying machine, the user authentication requesting unit 340 of the copying machine accepts the input (step S1401). The access control server 102 determines whether the user ID and password are valid, and when the user ID and password are valid, user authentication is completed.

The access control server 102 retrieves the access control token corresponding to the user ID in the database and transmits the access control token obtained by the retrieval to the copying machine 103.

The copying machine receives the above access control token (step S1402). In the embodiment 1, when the operation screen is displayed, the received access control token is not used. Therefore, for example, even when such information that "use of a color copy function is prohibited" is included in the access control token, the default operation screen is displayed by disregarding the information. The access control token is used in a step S1414.

Next, the copying machine displays the operation screen (FIG. 11) and accepts designation of a function to be used by the user (step S1403). In the embodiment 1, when the operation screen is displayed, the received access control token is not used. Therefore, for example, even when such information that "use of a color copy function is prohibited" is included in the access control token in a ticket, the default operation screen is displayed by disregarding the information.

Here, the screen which is beyond an authority of the logged-in user is displayed. The operation screen within the user authority and the operation screen beyond the user authority may be displayed in different colors. Even in this case, when the differently-colored operation screen beyond the user authority is displayed, the received access control token is not used in the embodiment 1. Therefore, the operation screen beyond the user authority can accept the user input.

When the user selects the copy button 1107, the copying machine detects that the copy button has been selected and starts a copy operation (step S1404).

Next, the copying machine determines whether the color printing button 1104 is selected and determines color printing/black-and-while printing (step S1405).

The copying machine further determines whether the two-dimensional code reading button is selected (step S1406). When the two-dimensional code reading button is not selected, the operations of steps S1407 to S1414 concerning reading of the two-dimensional code will be skipped.

When the two-dimensional code reading button is selected, the copying machine scans the document and analyzes the two-dimensional code from the scanned image data (step S1407).

Then, the copying machine determines whether the ticket is included in the two-dimensional code (step S1408) When the ticket is not included, the operations of steps S1409 to S1414 will be skipped.

When the ticket is included in the two-dimensional code, the copying machine analyzes the ticket (step S1409).

The operations will be described on the assumption that the expiration date of the ticket encoded by the two-dimensional code, the electronic signature of the access control server, and the user ID of the user who created the document (for example, suzuki 701) are always included in the ticket encoded by the two-dimensional code in the embodiment 1.

The copying machine determines whether the expiration date of the ticket encoded by the two-dimensional code has expired or not (step S1410).

When the expiration date has expired, it is displayed that the period has expired in the operation screen and the process is terminated. When the expiration date has not expired, the electronic signature obtained from the ticket encoded by the two-dimensional code is verified next (step S1411).

Normally, the electronic signature is encrypted by a secret key of RSA, and is decoded using a public key obtained from the access control server 102. The decoded electronic signature is compared with an electronic signature recorded in advance in the copying machine to verify integrity. When the electronic signature is not valid, it is displayed that the electronic signature is not valid in the operation screen and the process is terminated. When the electronic signature is determined to be valid, the copying machine obtains the user ID from the ticket encoded by the two-dimensional code (step S1412).

The obtained user ID is transmitted to the access control server and also, as the response, the access control token of the user (suzuki 701 who created the two-dimensional code) is obtained from the access control server (step S1413).

The obtained access control token is compared with the ticket of the authenticated user (tanaka 702 who is currently using the copying machine) and is recalculated (step S1414).

For example, in the access control token of the authenticated user (tanaka 702 who is currently using the copying machine), use of color copying is prohibited. Meanwhile, in the access control token of the user who created the ticket (suzuki 701 who created the two-dimensional code), use of color copying is permitted. Therefore, an access control token for permitting the use of color copying is recalculated (step S1414). For example, in the case where a printing actual performance value of the authenticated user (tanaka 702 who is currently using the copying machine) has reached the limit number of printing papers, the following operation will be performed. When a printing actual performance value of the user who created the ticket (suzuki 701 who created the two-dimensional code) has not reached the limit value of printing papers, access control information for permitting the use of printing is issued.

FIG. 8 illustrates one example of the access control information. In an area 801 in FIG. 8, a user name is defined in a UserName tag of a UserInfo tag, a user authority is defined in a BaseRole tag, and E-mail address of the user is defined in a UserEmail tag. In an area 802 in FIG. 8, access restriction of the user is defined in a DeviceAccessControl tag. In an AttributeStatement tag, "PdlPrintFlag (a flag for showing whether printing is permitted)" is set to "Permit" with respect to an attribute named "PdlPrint". An attribute of "ColorPrint" is set to "Color". An attribute of "Simplex (transmission)" is set to "Deny".

The recalculation of the access control token in the step S1414 in the embodiment 1 is performed as follows. The access control token is recalculated such that the user who is currently using the copying machine is permitted to use a function which one of the two users is permitted to use.

The recalculation of the access control token in the step S1414 in the embodiment 1 is also performed as follows. The access control token is recalculated such that the user who is currently using the copying machine is prohibited from using a function which both of the two users are prohibited from using.

The copying machine compares the recalculated access control token and all the functions designated in the step S1403 by tanaka 702 who is currently using the copying machine to determine an access right (step S1415).

That is, in the case where the color copy function is designated in the step S1403 by tanaka 702, who does not have an authority to use the color copy function, the following operation will be performed. When suzuki 701 has an authority to use the color copy function, tanaka 702 is determined to be able to use the color copy function.

When the functions designated in the step S1403 are determined to be usable, a copy process is executed in accordance with the functions designated in the step S1403 (step S1416).

In a step S1417, the actual performance value (information of the number of printing papers, the used functions, or the like) is transmitted to the access control server 102. The processing performed in the step S1417 will be described below with reference to FIG. 16.

Meanwhile, when it is determined that the use of the color copy function is prohibited in the step S1415, an error massage is displayed on the operation screen and the process is terminated in a step S1418.

Figure 16:
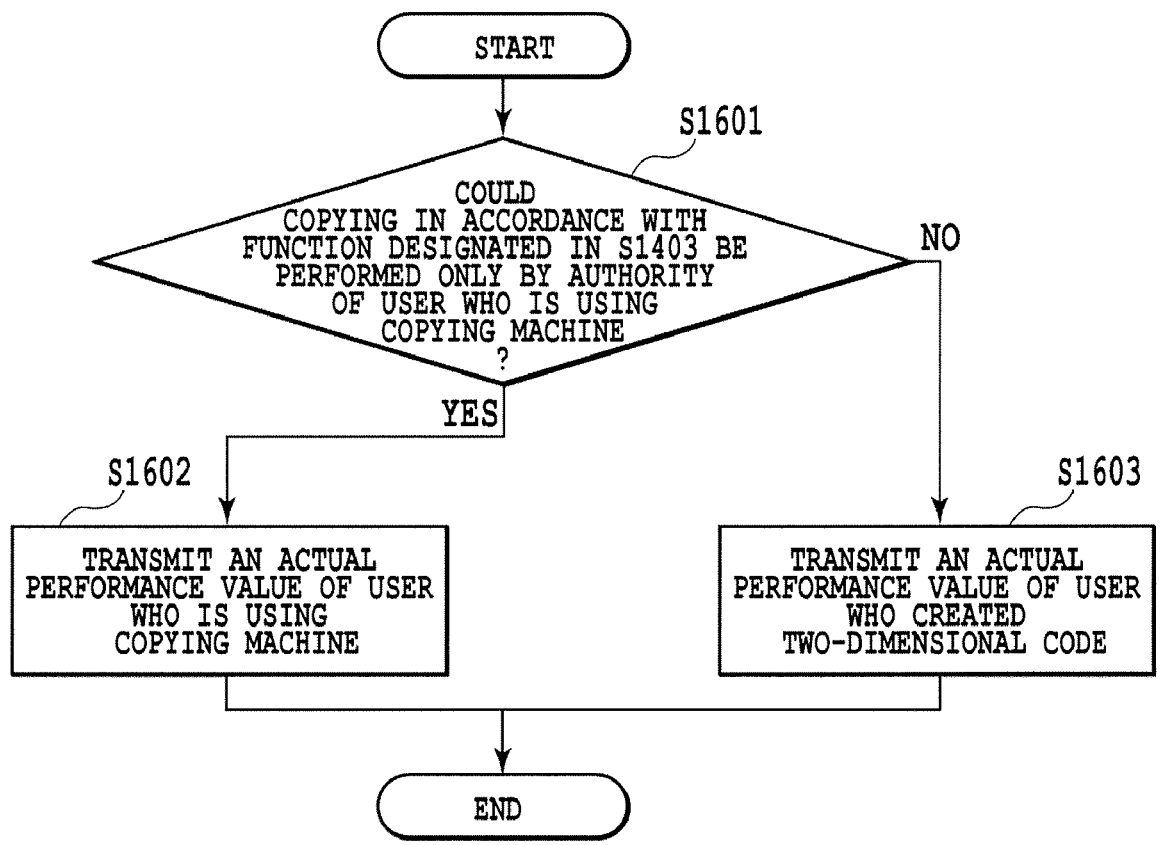
FIG. 16 is a diagram explaining a process in a step S1417 shown in FIG. 13 in detail.

FIG. 16 illustrates a flow for explaining the processing in the step S1417 in detail.

FIG. 16 illustrates a method used when the actual performance value is transmitted to the access control server 102 in the step S1417. By the method, it is determined whether the actual performance value is transmitted as the actual performance value of suzuki 701 who created the two-dimensional code or as the actual performance value of tanaka 702 who is currently using the copying machine.

In a step S1601, it is determined whether copying in accordance with the functions designated in the step S1403 could be performed only by the authority of the user who is using the copying machine.

In specific, the functions designated in the step S1403 and the access control token received in the step S1402 are compared. As the result of the comparison, when it is described in the access control token that use of all the functions designated in the step S1403 is permitted, it is determined that "copying in accordance with the functions designated in the step S1403 could be performed only by the authority of the user who is using the copying machine". In a reverse case, it is determined that "copying in accordance with the functions designated in the step S1403 could not be performed only by the authority of the user who is using the copying machine".

The processing in the step S1601 may be also described as follows.

The functions designated in the step S1403 and the access control token received in the step S1402 are compared. As the result of the comparison, when none of the functions designated in the step S1403 applies to "a function prohibited from using described in the access control token", it is determined that "copying in accordance with the functions designated in the step S1403 could be performed only by the authority of the user who is using the copying machine". In a reverse case, it is determined that "copying in accordance with the functions designated in the step S1403 could not be performed only by the authority of the user who is using the copying machine".

When "copying in accordance with the functions designated in the step S1403 could be performed only by the authority of the user who is using the copying machine", the process moves to a step S1602. In the step S1602, the information of the number of printing papers and the used functions of this time is transmitted to the access control server as the actual performance value of the user who is using the copying machine.

When "copying in accordance with the functions designated in the step S1403 could not be performed only by the authority of the user who is using the copying machine", the process moves to a step S1603. The information of the number of printing papers and the used functions of this time is transmitted to the access control server as the actual performance value of the user who created the two-dimensional code.

It is needless to say that the access control server renews the actual performance value at the time of receiving the actual performance value.

That is, in the case where suzuki 701 has the color printing actual performance value of five sheets until this time and the color printing actual performance value by this time is two sheets, the access control server adds the color printing actual performance value of 2 sheets to the color printing actual performance value of 5 sheets until this time. Accordingly, the color printing actual performance value is renewed to be 7 sheets.

By controlling as described above, the server managing the actual performance value can prevent the actual performance value from becoming an impossible value (it is possible to prevent the color printing actual performance value from being added to that of tanaka 702 who is not permitted to use color printing).

When "copying in accordance with the functions designated in the step S1403 could be performed only by the authority of the user who is using the copying machine", the actual performance value of the user who is using the copying machine is renewed (step S1602). Therefore, the actual performance value "to be added in principle to that of the user who used the copying machine" is added to that of the user who used the copying machine in accordance with the principle.

<Other Embodiments>

Figure 14:
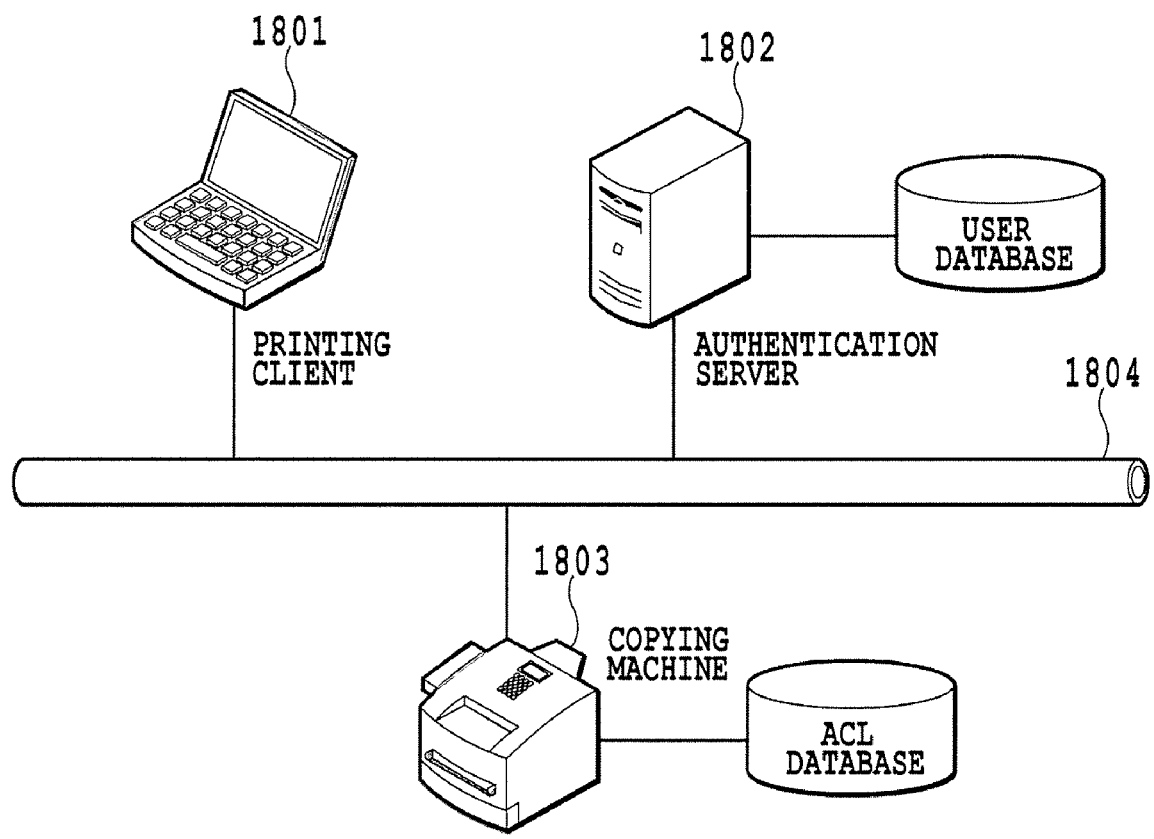
FIG. 14 illustrates hardware according to another embodiment.
Figure 15:
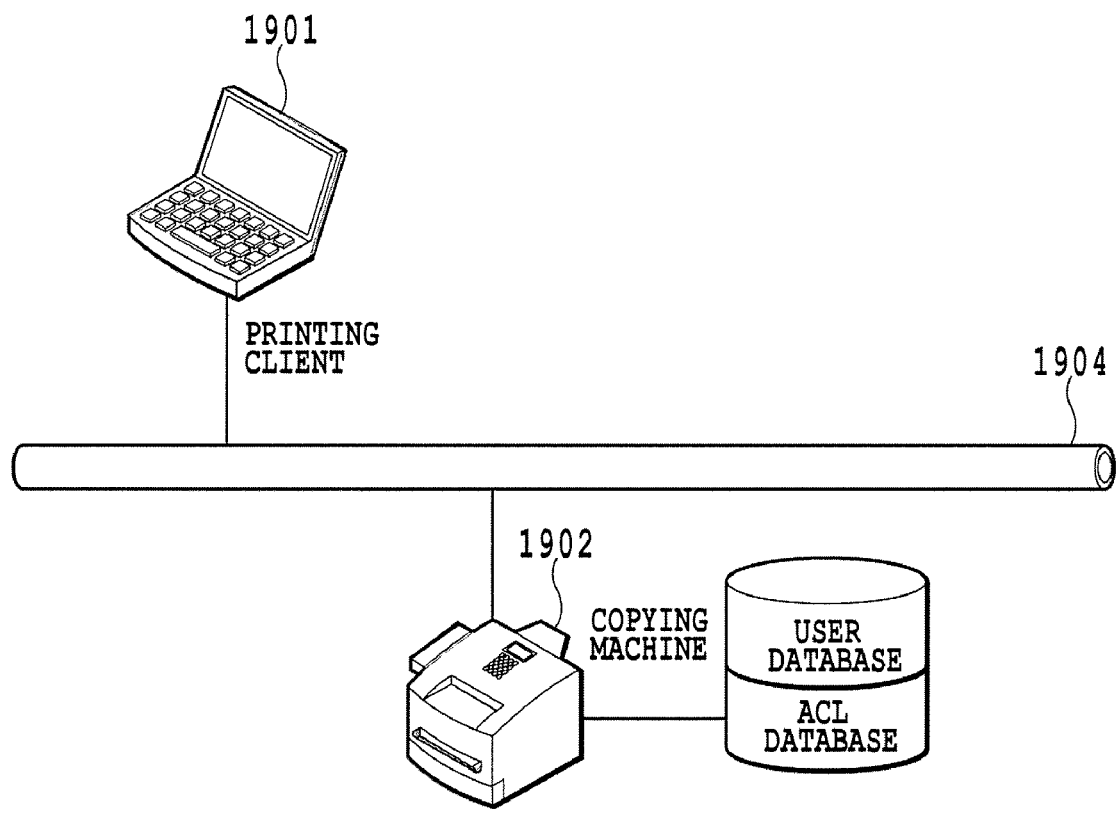
FIG. 15 illustrates hardware according to another embodiment.

The present invention may be performed without the access control server. For example, such an embodiment may be applied in which a printing client 1801 is connected to a network 1804, a copying machine 1803 has an ACL database, and an authentication server 1802 connected to the network 1804 performs user authentication as shown in FIG. 14. Alternatively, such an embodiment may be applied in which a printing client 1901 is connected to a network 1904 and a copying machine 1902 connected to the network 1904 has a user database and an ACL database as shown in FIG. 15. Furthermore, when there are a plurality of copying machines in a network, a particular copying machine may have a user database and an ACL database. In this case, a copying machine which does not have a database may obtain access control information from the particular copying machine.

The present invention may be applied to a document set including a printed material on which the two-dimensional code is printed and a printed material as a copy object of the copying machine on which the two-dimensional code is note printed. In this case, when the printed material on which the two-dimensional code is printed and the printed material as a copy object of the copying machine on which the two-dimensional code is not printed are placed in the copying machine as one document set, the same process as in the embodiment 1 is executed on the document set.

The apparatus referred to as the copying machine in the present specification may be also called an image forming apparatus. An essential condition for the image forming apparatus is only a function of printing an image on a sheet.

The component referred to as the controller in the present specification may be also called an image processing component. An apparatus having the image processing component may be also called an image processing apparatus. An essential condition for the image processing apparatus is only a function of processing image data.

When there are a plurality of means for achieving a certain function in the above embodiment, the plurality of means may be called first means and second means. For example, the plurality of means may be called first obtaining means and second obtaining means. For example, the plurality of means may be called first executing means and second executing means. For example, the plurality of means may be called first prohibiting means and second prohibiting means.

Furthermore, in order to execute the image processing method according to the present invention as described above on a computer, a storage medium, readable by a computer, for storing a program for executing the image processing method according to the present invention as described above may be used.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-153200, filed Jun. 8, 2007, which is hereby incorporated by reference herein in its entirety.

What is claimed is:

1. An information processing apparatus which permits the usage of a first user's access privilege by a second user, comprising:
   an authentication unit which accepts login information from the second user;
   a first determining unit which, upon successful authentication of the second user, determines whether a number of sheets of printing paper used by the second user on the information processing apparatus has reached a limit based on the login information;
   a scanning unit which scans a document from the second user into image data;
   an analyzing unit which extracts a two-dimensional code from the image data and identification information of the first user, who is different from the second user, from the two-dimensional code;
   a second determining unit which determines whether a number of sheets of printing paper used by the first user on the information processing apparatus has reached the limit based on the identification information;
   a printing unit which prints the image data; and
   an incrementing unit which, based on the printing of the image data,
   increments the number of sheets of printing paper used by the second user if the number of sheets of printing paper used by the second user has not reached the limit, and
   increments the number of sheets of printing paper used by the first user if the number of sheets of printing paper used by the second user has reached the limit but the number of sheets of print paper used by the first user has not reached the limit.

* * * * *